Patented Oct. 10, 1933

1,929,619

UNITED STATES PATENT OFFICE 1,929,619

PRODUCTION OF ALKALI METAL ALUMINATES

Robert Odiorne Wood, Hamburg, N. Y., assignor to National Aniline & Chemical Company, Inc., New York, N. Y., a corporation of New York No Drawing. Application November 3, 1930
Serial No. 493,133

12 Claims. (Cl. 23—52)

This invention relates to the utilization of waste alumina sludges and of waste iron oxide sludges for the production of alkali metal aluminates and of useful products comprising iron oxide, and is more particularly concerned with the production of aqueous solutions, especially stable aqueous solutions, of alkali metal aluminate containing alkali metal hydroxide.

In the manufacture of organic compounds by the Friedel-Craft reaction or synthesis, e. g., the production of o-benzoylbenzoic acid, its homologues and analogue, by the condensation of phthalic anhydride or derivatives thereof with aromatic hydrocarbons or their substitution products in the presence of anhydrous aluminum chloride, alumina sludges are obtained which are regarded as by-products having little or no value or use. They are ordinarily composed of aluminum hydrate, or of basic aluminum carbonate, or of both, contaminated with various quantities of organic matter, and may also contain more or less amounts of alkali and other impurities.

Similarly, in the reduction of organic nitro compounds by the action of iron in the presence of neutral or of slightly acid media, e. g., the production of aniline by the reduction of nitrobenzene, large amounts of iron oxide sludge are obtained, the disposal of which constitutes a difficult economic problem. The iron sludges thus obtained are largely composed of ferrosoferric oxide contaminated with various amounts of organic matter, and may also contain more or less amounts of metallic iron and other impurities. Further, both the alumina and iron oxide sludges ordinarily contain considerable quantities of water in the free and/or combined state.

One of the objects of the present invention is the utilization of alumina sludges and of iron oxide sludges for the production of useful products.

Another object of the present invention is the utilization of alumina sludges and of iron oxide sludges for the production of an alkali metal aluminate.

A further object of the invention is the utilization of said sludges in the preparation of a product comprising an activated iron oxide which is useful as an agent in gas purification or in the preparation of pigments.

Still another object of the invention is the preparation of solutions, more particularly stable solutions, of alkali metal aluminate containing alkali metal hydroxide.

Further objects will be apparent from the following disclosure and claims relating to the present invention.

According to the present invention, it has been found that when an admixture comprising an alumina sludge and an iron oxide sludge is calcined or ignited in the presence of an alkali metal carbonate, preferably in the presence of air, a reaction takes place with formation of a resultant reaction or calcined mass which upon lixiviation with water yields a solution containing an alkali metal aluminate and an insoluble residue comprising an activated iron oxide.

It has been further found that the production of an alkali metal aluminate or of an activated iron oxide by the calcination in the presence of alkali metal carbonate of an admixture of alumina and iron oxide sludges gives results with respect to said products which are superior to those obtained by the calcination in the presence of said carbonate of an alumina sludge alone or of an iron oxide sludge alone. Each sludge apparently acts as an assistant to the other in the formation of their respective products as shown by the fact that the yield of alkali metal aluminate is improved over that produced in the absence of the iron sludge and that the quality of the iron oxide is improved over that produced in the absence of the alumina sludge.

It has been also found that the proportions or amounts of iron oxide sludge and of alkali metal carbonate which are in admixture with the the alumina sludge may vary over a wide range, and that the proportions employed may be so regulated that the resultant calcined mixture upon lixiviation with water yields a solution of the alkali metal aluminate which contains free alkali metal hydroxide, i. e., caustic alkali, and that the insoluble residual product containing the iron oxide retains its value for use in gas purification or for use in the manufacture of a pigment. By altering the proportion of alumina sludge, iron oxide sludge and alkali metal carbonate in the mixture to be calcined, it is thus possible by lixiviation of the calcined mass to obtain solutions of alkali metal aluminate which contain various amounts of free alkali metal hydroxide ranging from those which contain very little free alkali metal hydroxide to those solutions which contain a quantity of alkali metal hydroxide equal to, or greater than, the quantity of alkali metal aluminate present, and said solutions by evaporation, by dilution with water, or by using a definite amount of water in the lixiviation of the calcined mass, may be obtained in such concentrations as may be desired or as the solubilities of the ingredients will permit. In this manner, for example, aqueous solutions containing from 5 to 16 per cent., or more, of alkali metal aluminate and an equal or different percentage of alkali metal hydroxide may be prepared.

In the practice of the present invention, the alumina sludge, iron oxide sludge and alkali metal carbonate are thoroughly and intimately mixed, preferably with sufficient water present to produce a thick homogeneous paste, and the mixture is then calcined, preferably in an oxidizing atmosphere, e. g., air, at a low red to a bright red or bright cherry heat, i. e., 650° to 900° C., preferably at about 675° to 750° C. When the reaction is completed, the calcined mass is lixiviated with hot water, e. g., from about 40° C. to boiling, and the insoluble residual product subsequently removed from the solution by filtration or in any other suitable manner. During the lixiviation of the calcined mass, the alkali metal aluminate is dissolved and the alkali metal ferrite which is present is decomposed with formation of caustic alkali which passes into solution and of an insoluble product which is composed chiefly of activated iron oxide. Calculating, by analysis, the iron content of the iron sludge as ferroso-ferric oxide $Fe_3O_4$, and the aluminum content of the alumina sludge as aluminum oxide, $Al_2O_3$, the present invention preferably employs an amount of iron sludge such that the mixture to be calcined contains approximately one-half to two, or more, mols of ferroso-ferric oxide to one mol of aluminum oxide. The amount of alkali metal carbonate employed in the mixture is preferably sufficient to combine or interact with all of the aluminum oxide and with part or all of the ferroso-ferric oxide to form alkali metal aluminate and alkali metal ferrite, respectively, so that no, or very little, free alkali metal carbonate is present in the calcined mass, e. g., one mol of alkali metal carbonate to each mol of aluminum oxide and not more than about one and one-half mols to each mol of ferroso-ferric oxide, but other amounts of alkali metal carbonate may be used if desired. In the production of stable solutions of alkali metal aluminate, for each mol of aluminum oxide there is preferably employed about one and on-half to two mols ferroso-ferric oxide and from two to three mols alkali metal carbonate.

The calcination of the mixture may be carried out in any suitable apparatus, for example, in a rotary tube furnace or kiln.

In the lixiviation of the calcined mass, any amount of water may be used but the amount preferably employed is as little as possible, e. g., an amount of water equal in weight to the weight of the calcined mass may be used. Upon removal of the insoluble iron oxide from the solution it may be further washed and the washings used in lixiviating a subsequent calcined mass.

The invention will be further illustrated by the following example, but it will be understood that the invention is not limited thereto. The parts are by weight.

Example.—100 parts of air-dried alumina sludge containing about 31 per cent. of aluminum oxide (one mol) is thoroughly mixed with about 135 parts of finely divided and air-dried iron oxide sludge (aniline sludge) containing about 80 per cent. of ferroso-ferric oxide (1.5 mols), and about 100 parts (3 mols) of soda ash (96 per cent. pure), and sufficient water (about 50 to 75 parts) to form a thick, homogeneous, coherent paste. The paste is then charged into the cool end of a rotary furnace or kiln where the water is driven off. As the charge moves to the hotter part of the kiln, the organic matter which is present burns off until it finally reaches the hottest part of the kiln where it is subjected to a bright cherry heat, i. e., about 700° to 725° C., and is discharged from the kiln in the form of a granular mass. The time required for the passage of the charge through the kiln is about 1 to 2 hours. Throughout its passage through the kiln, the charge is subjected to an oxidizing atmosphere. The calcined mass, either with or without previous cooling, is added to about 300 to 350 parts water, and the mixture digested at about 70° to 80° C. until disintegration and decomposition is complete. The resultant solution of sodium aluminate and sodium hydroxide is then removed by filtration or by any other suitable means from the residual insoluble iron compound. The solution of sodium aluminate thus obtained contains about equal quantities of sodium aluminate and sodium hydroxide, and is comparatively stable in that it tends to give no deposit of sodium aluminate or of alumina upon standing. It may be used for any desired purpose, for example, as an agent in the purification of water or it may be carbonated to precipitate the alumina. The insoluble iron compound, with or without further washing, may be used, if desired, as a gas purifying agent, or it may be calcined or ignited and the resultant product used as a pigment.

In the above example, the time required for the passage of the charge through the kiln will depend largely upon the size of the charge, and the speed of rotation, the length, and the slope or dip of the kiln as is well known in the art of calcination. The time allowed should be sufficient to permit thorough interaction of the ingredients of the charge, and ordinarily about 1.5 hours will be required. A longer time, however, does no harm. In general, temperatures around 700° to 725° C. appear to give the best results. Further, in place of soda ash an equivalent weight of potassium carbonate, or a mixture of sodium and potassium carbonates, may be employed For example, "fished salt", which is composed of sodium carbonate usually in admixture with various quantities of potassium carbonate and caustic alkali, may be employed.

It will be understood that, in general, any alumina sludge and any iron oxide sludge may be utilized in the present invention. Iron oxide sludges, for example, produced by the reduction of aromatic nitro compounds by means of iron in the presence of aluminum or of aluminum salts, or in the presence of any agent which upon treatment with water gives hydrogen ions, may be used in the practice of the present invention.

I claim:

1. A process which comprises calcining a commixture of an alumina sludge and an iron oxide sludge in the presence of an alkali metal carbonate.

2. A process which comprises calcining at a low red to bright cherry heat an intimate mixture comprising an alumina sludge, an iron oxide sludge, and an alkali metal carbonate.

3. A process which comprises calcining a commixture of an alumina sludge, an iron oxide sludge containing ferroso-ferric oxide, and an alkali metal carbonate in the presence of an oxidizing atmosphere.

4. A process which comprises calcining aluminum oxide in the presence of an alkali metal carbonate and of ferroso-ferric oxide.

5. A process for the production of alkali metal aluminate and of a product containing an activated iron oxide which comprises calcining at a temperature of 650° to 900° C. in the presence of air a commixture comprising an alumina sludge, an iron oxide sludge, and an alkali metal carbonate, treating the resultant calcined mass with water, and separating the solution of alkali metal aluminate thus obtained from the insoluble residual product which contains activated iron oxide.

6. A process which comprises calcining an alumina sludge containing the equivalent of one mol of aluminum oxide with an iron oxide sludge containing the equivalent of about one-half to two mols of ferroso-ferric oxide in the presence of an amount of alkali metal carbonate sufficient to combine with substantially all of the alumina oxide and with part of the ferroso-ferric oxide present in the mixture to form alkali metal aluminate and alkali metal ferrite respectively, treating the resultant calcined mass with hot water, and separating the aqueous solution thus obtained from the insoluble residue.

7. A process which comprises calcining an alumina sludge, derived as a by-product in the Friedel-Craft reaction, with an iron oxide sludge derived by the reduction of an organic nitro compound by means of iron in neutral or slightly acid aqueous media, in the presence of alkali metal carbonate.

8. A process for the production of a stable sodium aluminate solution which comprises calcining an alumina sludge, derived as a by-product in the Friedel-Craft reaction, and containing the equivalent of one mol of aluminum oxide, with an iron oxide sludge, derived as a by-product in the reduction of aromatic nitro compounds by means of iron in neutral or slightly acid media and containing the equivalent of about one and one-half to two mols of ferroso-ferric oxide, in the presence of two to three mols of sodium carbonate in the presence of air at a temperature of about 700° to 725° C., treating the resultant calcined mass with hot water, and subsequently removing the insoluble product from the aqueous solution thus obtained.

9. A process which comprises calcining a mixture of an alumina sludge and an iron oxide sludge in the presence of an alkali.

10. A process which comprises calcining in the presence of an alkali metal carbonate a mixture of an alumina sludge and an iron oxide sludge, said mixture containing the equivalent of at least ½ mol of ferroso-ferric oxide for each mol of alumina.

11. A process which comprises calcining in the presence of an alkali, a mixture of an alumina sludge and an iron oxide sludge, said mixture containing the equivalent of at least ½ mol of ferroso-ferric oxide for each mol of alumina.

12. A process for the production of alkali metal aluminate and of a product containing an activated iron oxide which comprises calcining at a temperature of 650° to 900° C. a commixture comprising an alumina sludge, an iron oxide sludge, and an alkali, treating the resultant calcined mass with water, and separating the solution of alkali metal aluminate thus obtained from the insoluble residual product which contains activated iron oxide.

ROBERT ODIORNE WOOD.